(12) United States Patent
Caldwell

(10) Patent No.: US 6,697,685 B1
(45) Date of Patent: Feb. 24, 2004

(54) FLEXIBLE CLOSED-LOOP CONTROLLER

(75) Inventor: David J. Caldwell, 319 Palos Verdes Bl, #216, Redondo Bch, CA (US) 90277

(73) Assignee: David J. Caldwell, Carlsbad, CA (US)

( * ) Notice: Subject to any disclaimer, the term of this patent is extended or adjusted under 35 U.S.C. 154(b) by 409 days.

(21) Appl. No.: 09/706,284

(22) Filed: Nov. 4, 2000

Related U.S. Application Data
(60) Provisional application No. 60/164,091, filed on Nov. 6, 1999.

(51) Int. Cl.$^7$ .......................... G05B 11/01; G05B 13/02
(52) U.S. Cl. ............................. 700/71; 700/28; 700/37; 700/44; 700/45; 700/47; 134/57 D; 318/254; 318/439; 318/671; 318/685; 318/696
(58) Field of Search ................................ 318/671, 685, 318/254, 439, 696; 700/28, 37, 44, 45, 47, 71; 134/57 D

(56) References Cited

U.S. PATENT DOCUMENTS

| | | | | |
|---|---|---|---|---|
| 4,788,647 A | * | 11/1988 | McMannus et al. | 700/287 |
| 5,023,924 A | * | 6/1991 | Tajima et al. | 388/811 |
| 5,325,582 A | * | 7/1994 | Glaser et al. | 29/840 |
| 5,371,670 A | * | 12/1994 | Lurie | 700/40 |
| 5,420,785 A | * | 5/1995 | Shinskey | 700/37 |
| 5,828,247 A | * | 10/1998 | Moller et al. | 327/110 |
| 6,005,377 A | | 12/1999 | Chen | 323/283 |
| 6,031,749 A | | 2/2000 | Covington | 363/98 |

OTHER PUBLICATIONS

LM628, 1999, Precision Motion Controller, Datasheet, 24pgs, National Semiconductor Corporation.
HCTL–1100, 1999, General Purpose Motion Control IC, Datasheet, 40pgs, Agilent Technologies Corporation.
Power System World '98, Nov. 12, 1998, "Power Control: Digital Flexibility at Analog Prices", Conference, 6pgs, David Caldwell, HFPC '98 pp 207–212.

* cited by examiner

Primary Examiner—Anil Khatri
Assistant Examiner—Douglas M. Shute

(57) ABSTRACT

A flexible closed-loop controller capable of being quickly and easily configured for a broad range of applications. The controller contains a set of control elements that may be configured or reconfigured for any specific application. Built-in configuration management automates configuration of the control elements dependent on user commands or operating conditions. The controller is autonomous after initial configuration, although it may be used interactively. This flexible closed-loop controller is suitable for switching power supplies, linear amplifiers, AC inverters, battery chargers, electronic loads, temperature and pressure management, motor or actuator drives, as well as industrial automation, data acquisition, and automatic test equipment. The controller reduces development time and cost, reduces parts count and cost, and improves performance and reliability of real-time closed-loop systems.

18 Claims, 9 Drawing Sheets

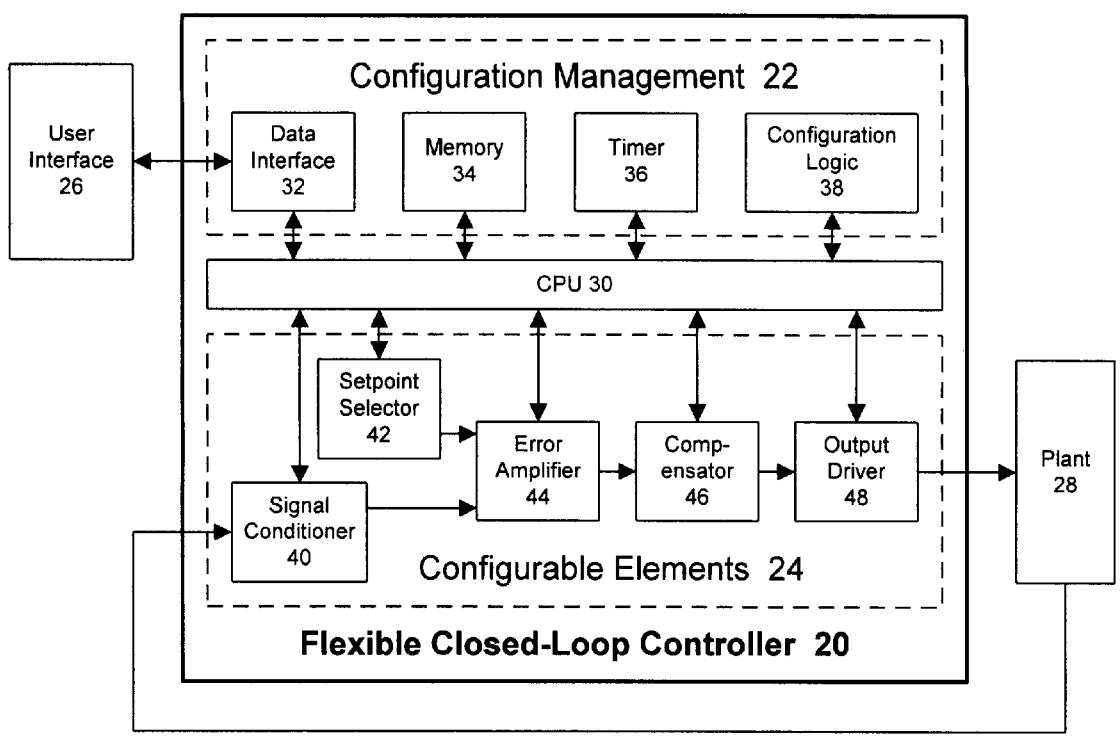
Figure 1. Invention Preferred Embodiment

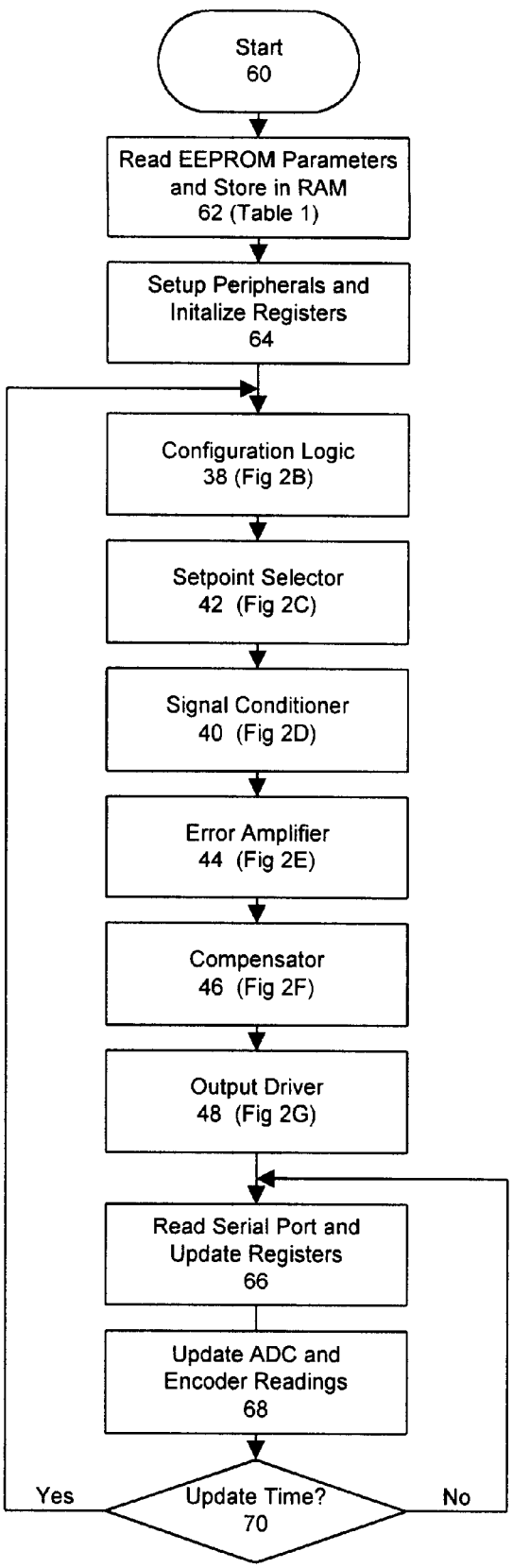
Figure 2A. Invention Firmware Main Loop

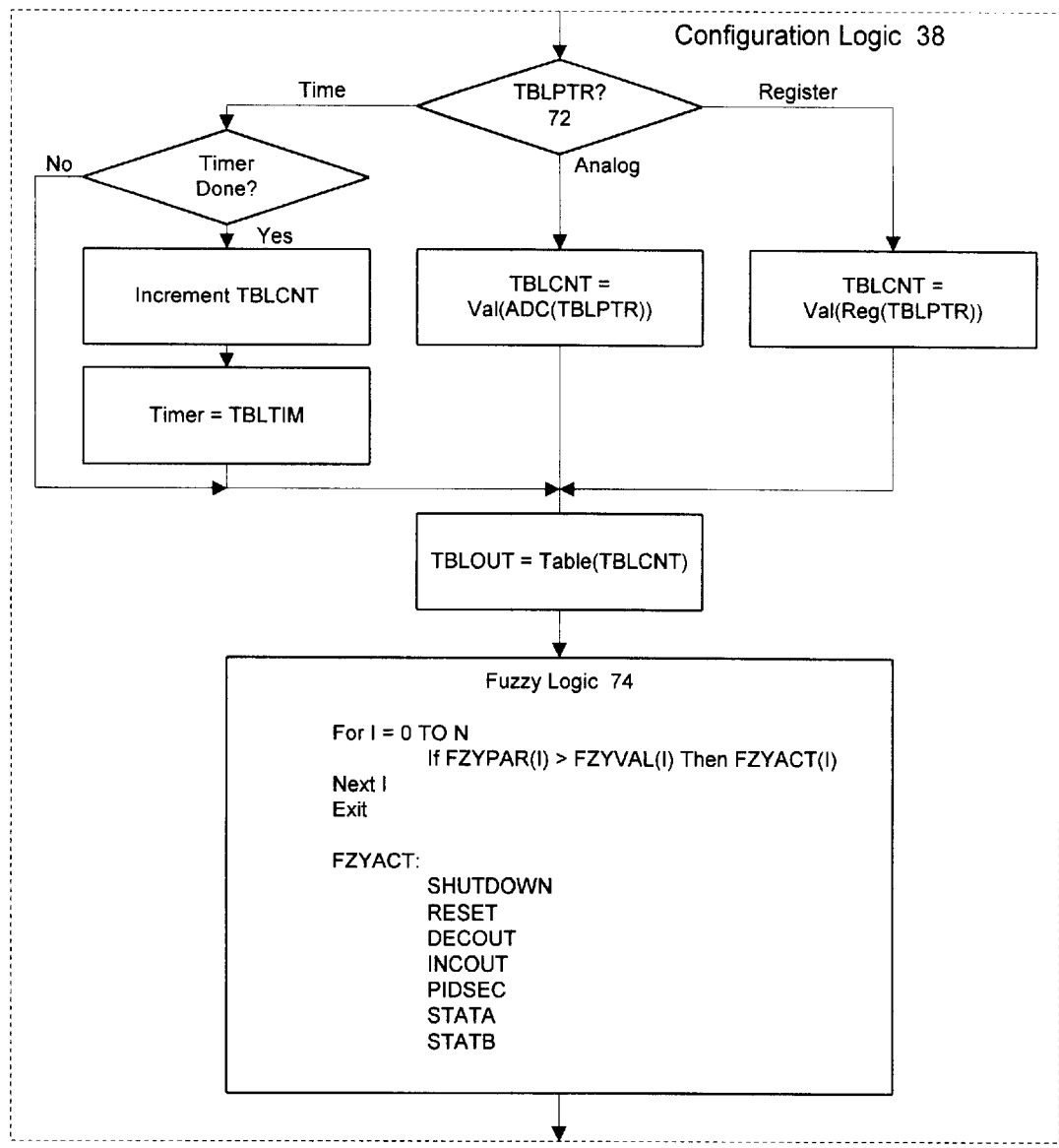
Figure 2B. Invention Firmware Configuration Logic

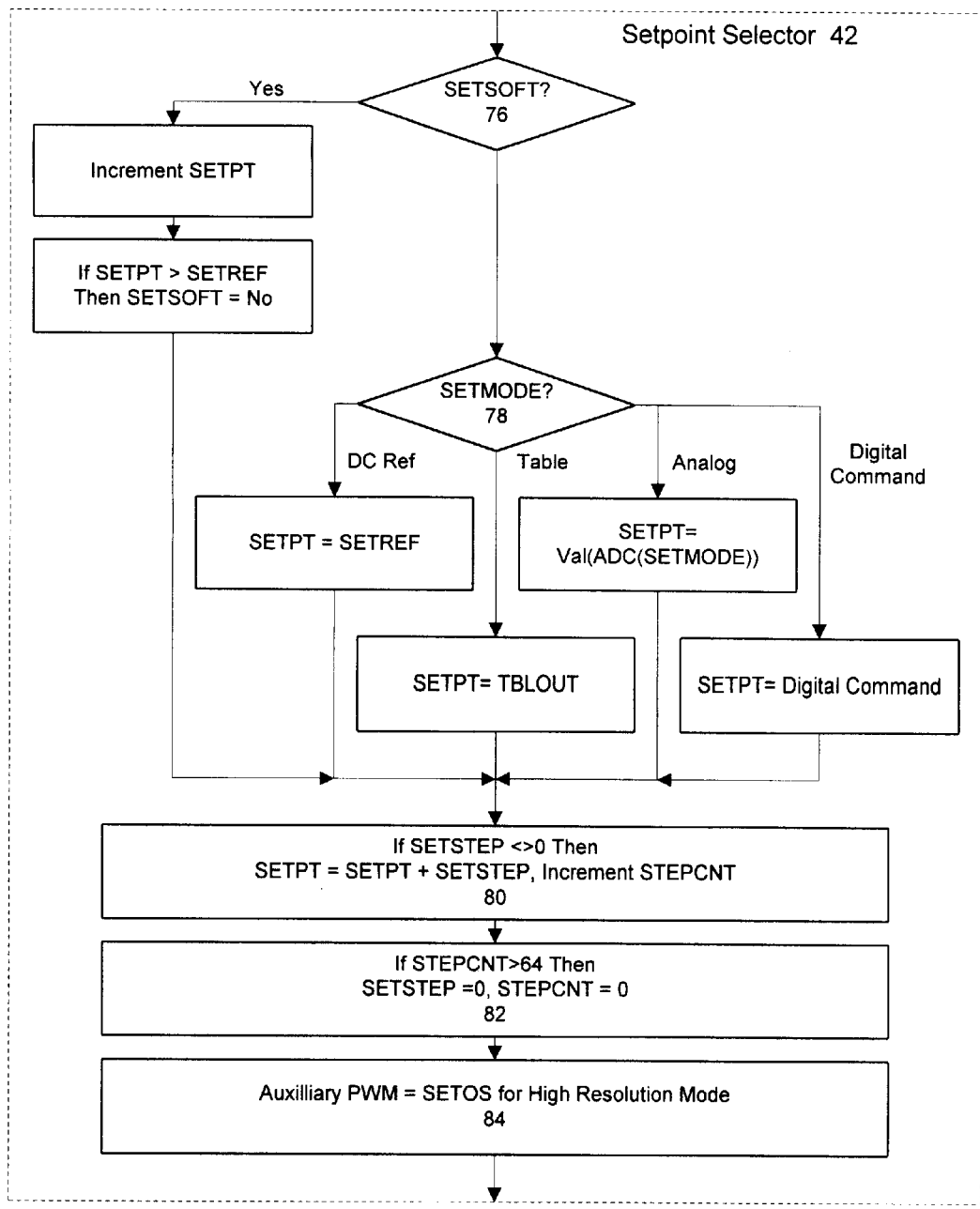
Figure 2C. Invention Firmware Setpoint Selector

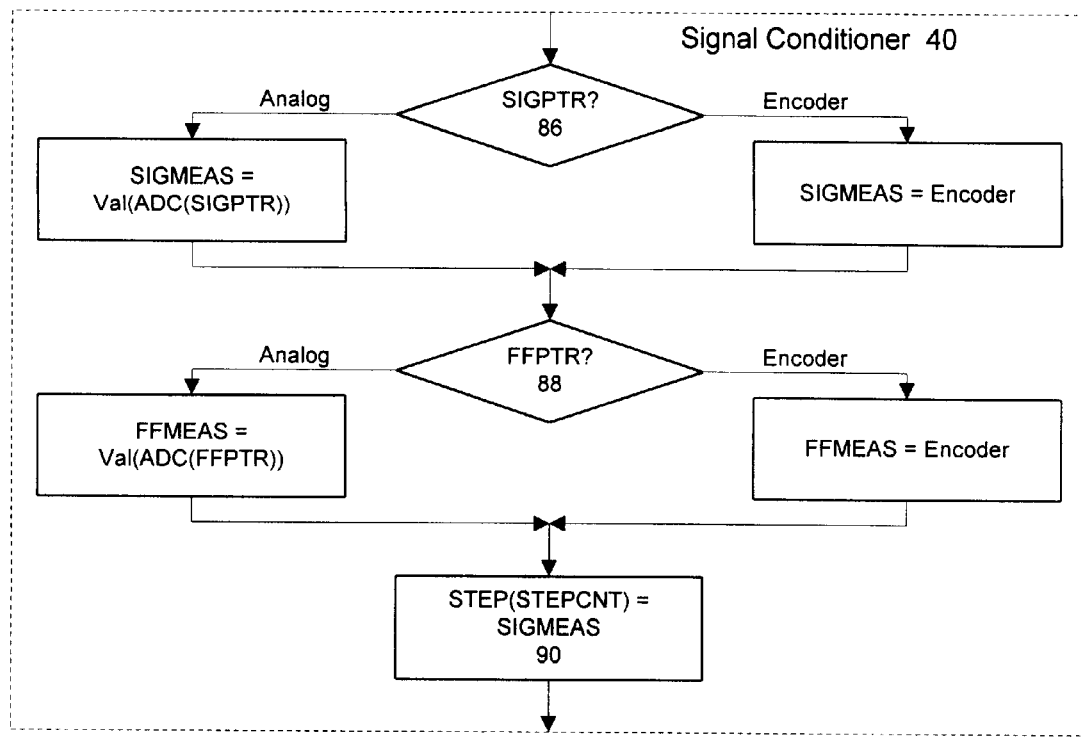
Figure 2D. Invention Firmware Signal Conditioner
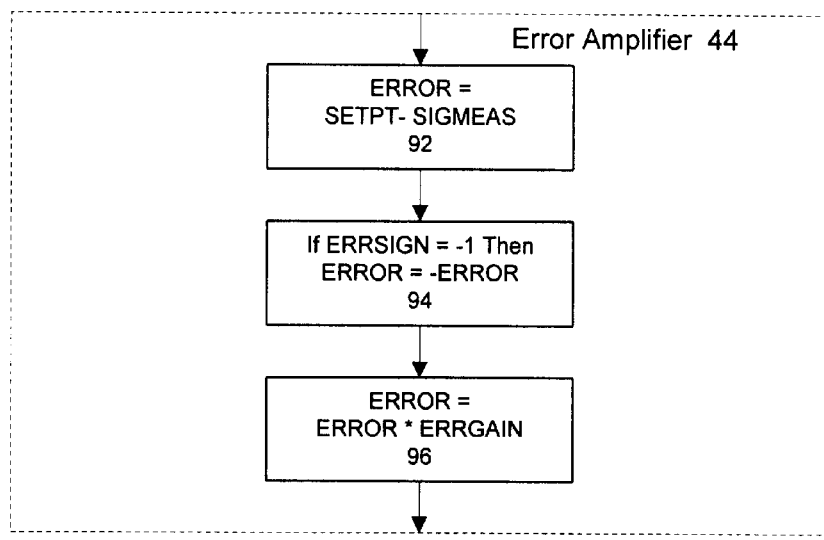
Figure 2E. Invention Firmware Error Amplifier

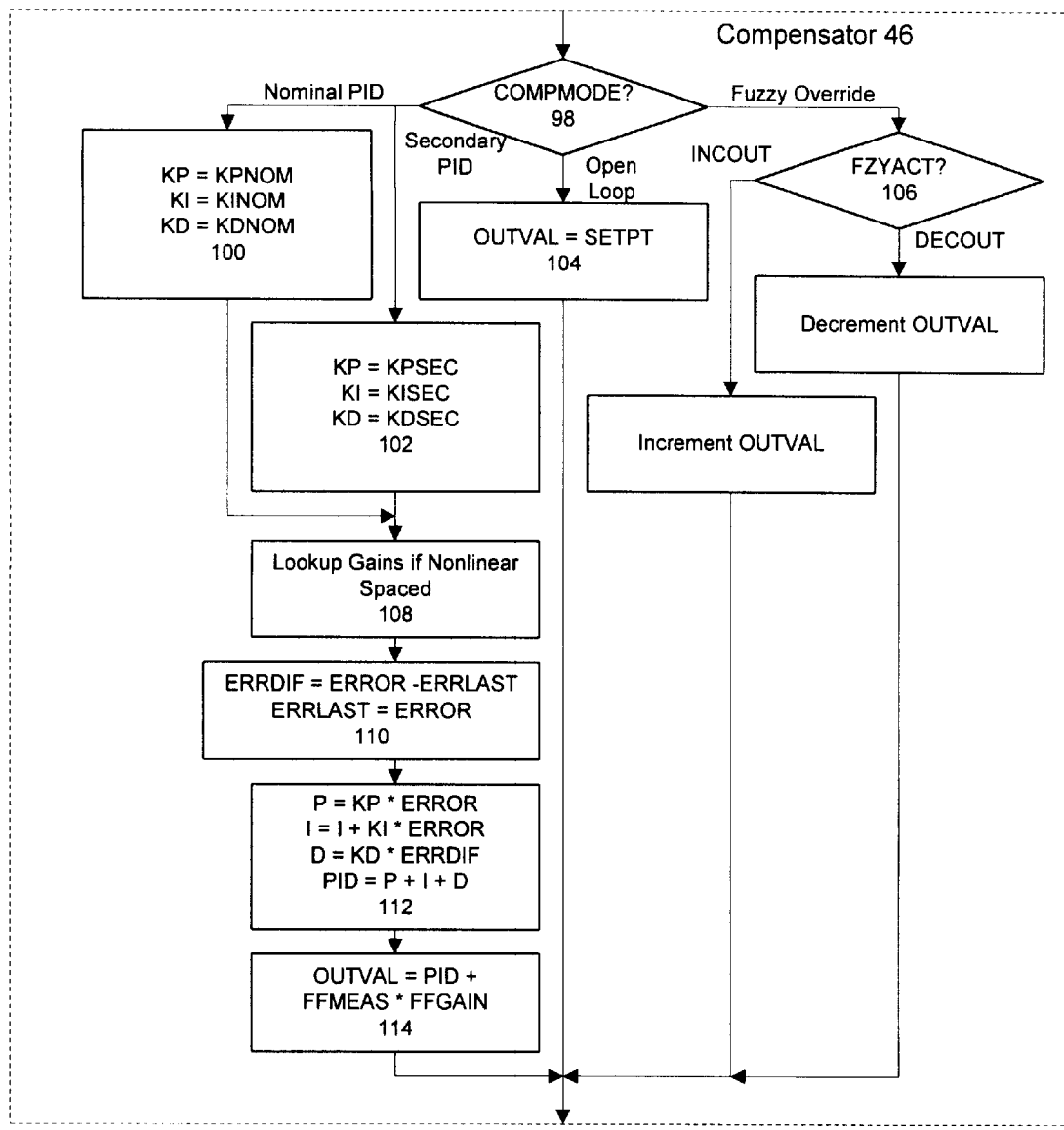
Figure 2F. Invention Firmware Compensator

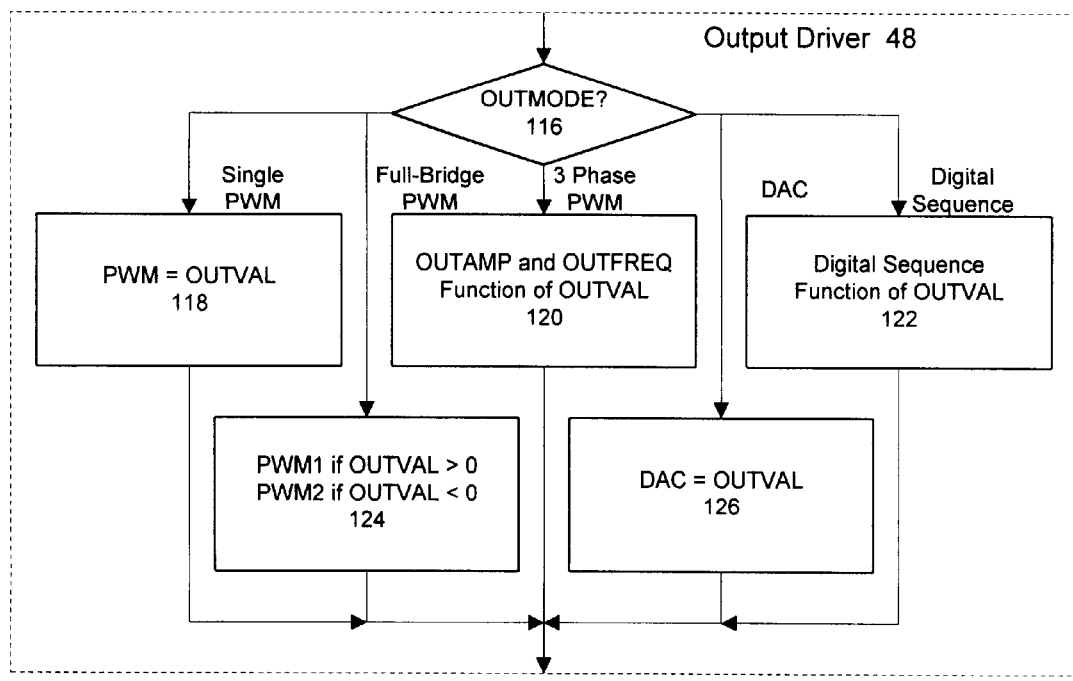
Figure 2G. Invention Firmware Output Driver

' Configuration Logic Parameters
TBLPTR              ' Lookup table pointer: timer, ADC(N), operational parameter
TBLTIM              ' Interval for time based lookup table
TLBCNT              ' Table step counter
TBLOUT              ' Lookup table result
FZYPAR(N)           ' Fuzzy logic parameter
FZYVAL(N)           ' Fuzzy logic comparison value
FZYACT(N)           ' Fuzzy logic action
' Setpoint Selector Parameters
SETPT               ' Setpoint for closed loop control
SETMODE             ' Setpoint source: static reference, table, ADC(N), digital or serial command
SETLIM              ' Setpoint limit
SETSOFT             ' Setpoint softstart (initial ramp-up)
SETSTEP             ' Setpoint step response
STEPCNT             ' Step response counter
SETREF              ' Static setpoint
SETOS               ' Setpoint offset for high resolution mode
' Signal Conditioner Parameters
SIGPTR              ' Closed loop signal pointer: ADC(N), encoder
SIGMEAS             ' Measured closed loop signal
SIGGAIN             ' Closed loop signal scale factor
SIGOS               ' Closed loop signal offset
FFPTR               ' Feedforward signal pointer: ADC(N), encoder
FFMEAS              ' Measured feedforward signal
STEP(N)             ' Recorded step response
' Error Amplifier Parameters
ERROR               ' Error signal: setpoint -measured
ERRSIGN             ' Error sign: invert or noninvert
ERRGAIN             ' Error scale factor
' Compensation Parameters
COMPMODE            ' Compensation mode: open loop, nominal or secondary gains, nonlinear gains
KP                  ' Proportional Gain
KI                  ' Integral Gain
KD                  ' Differential Gain
TUPDATE             ' Servo update interval
KPNOM               ' Nominal proportional gain
KINOM               ' Nominal integral gain
KDNOM               ' Nominal differential gain
KPSEC               ' Secondary proportional gain
KISEC               ' Secondary integral gain
KDSEC               ' Secondary differential gain
FFGAIN              ' Feedforward gain
ERRDIF              ' Differential error
ERRLAST             ' Last update error
'Output Driver Parameters
OUTMODE             ' Output mode: single, dual, three phase PWM, DAC, sinusoidal
OUTVAL              ' Output value
OUTLIM              ' Output limit
OUTAMP              ' Sinusoidal output amplitude
OUTFREQ             ' Sinusoidal output frequency
OUTPHASE            ' Sinusoidal output phase Figure 2H Invention Firmware Operational Parameters

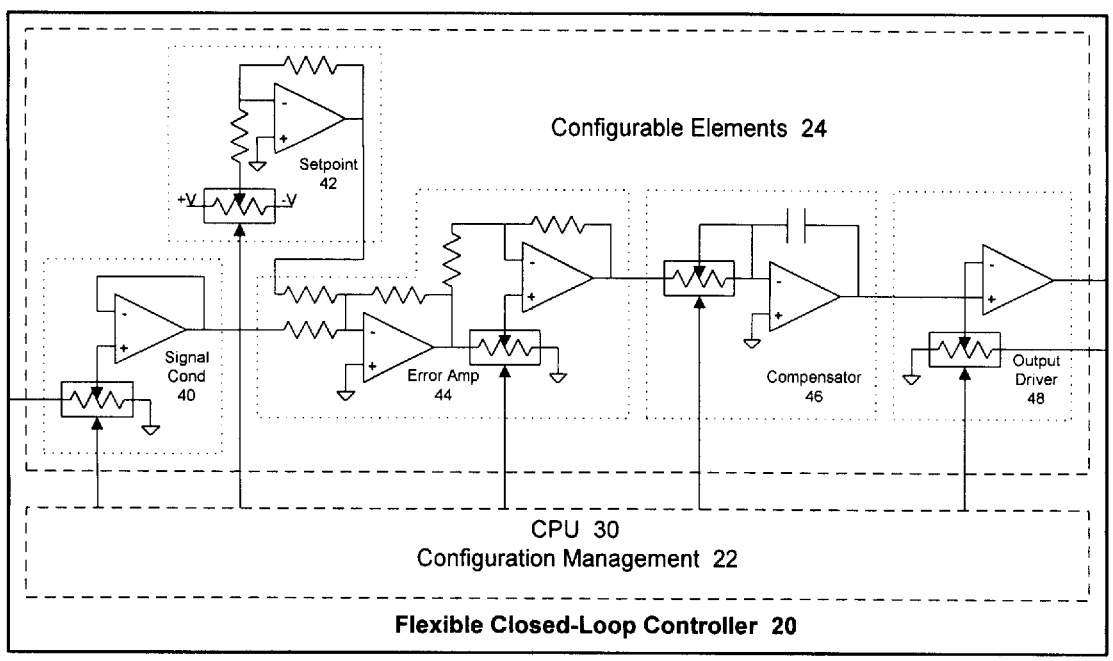
Figure 3. Invention Alternate Implementation

FLEXIBLE CLOSED-LOOP CONTROLLER

CROSS-REFERENCE TO RELATED APPLICATIONS

This application is entitled to the benefit of Provisional Patent Application Ser. No. 60/164,091 filed Nov. 6, 1999.

BACKGROUND

1. Field of the Invention

This invention is an electronic apparatus for control of closed-loop systems.

2. Description of Prior Art

Closed-loop control is common to many electronic applications. Examples include: voltage control of a switching power supply, velocity control of an industrial motor, temperature control of a household appliance, or current control of a linear amplifier in automatic test equipment. Closed-loop control is accomplished by adjusting an output driver until an input sensor or feedback signal matches a desired setpoint. Improper design can result in large errors, slow response, or instability.

Traditional closed-loop controllers have been comprised of either analog circuitry or software driven microprocessors. Analog circuitry requires a large number of components, specialized design expertise, and must be physically altered to modify performance or functionality. Microprocessors allow software to be modified without physically altering the circuit, but still require long programming cycles by specialized personnel and are subject to the performance limitations of standard processors. In both cases, development efforts are long and expensive.

Specialized motion control integrated circuits have been developed, such as the LM628 by National Semiconductor or the HCTL-1100 by Hewlett. Packard. These devices decrease development time by incorporating common motion control components and features that may selected through a host processor. However, these devices lack flexibility since there are designed for specific applications containing brush DC motors with digital encoder feedback. For example, they could not be used to regulate voltage in a power supply, temperature in an appliance, or current in a linear amplifier. Another limitation is that they are not autonomous since they require a host processor.

U.S. Pat. No. 6,031,749 discloses a power module that is intended to be universal but only satisfies a limited subset of closed-loop applications, namely lighting applications. The control laws and architecture disclosed are specific to lighting applications and are not universal.

U.S. Pat. No. 6,005,377 discloses a programmable controller for switching power conversion that does not utilize software or analog circuitry. This patent describes a Field Programmable Gate Array (FPGA) that utilizes lookup tables based on analog inputs. This controller requires extensive development time by personnel with specialized expertise and equipment. It may not be quickly and easily modified since the patent specifically excludes software dependence.

U.S. Pat. No. 5,371,670 discloses a controller with a tilt term in the compensation network. This compensation network has adjustable gains but no means are disclosed to reconfigure the controller to applications other than invariant linear systems. A fixed signal path is shown with no selectable options other than adjustable compensator gains.

U.S. Pat. No. 4,788,647 discloses a controller for hydroelectric power plants. Limited configuration of application specific components within an application specific architecture allows adaptation to a particular hydroelectric power plant. The specialized components and architecture with limited configuration capability preclude adaptation to applications other than hydroelectric power generation.

These products and patents indicate the strong need for a flexible closed-loop controller that is capable of satisfying a broad range of applications with minimal development time and expertise.

SUMMARY

This invention is a flexible closed-loop controller that may be quickly and easily configured for a broad range of applications.

OBJECTS AND ADVANTAGES

This invention takes advantage of the fact that virtually all closed-loop control applications contain the same basic elements, whose configuration is application dependent. By incorporating configurable control elements with automated configuration management, a flexible closed-loop controller is achieved that may be quickly and easily configured for a broad range of applications. Accordingly, several objects and advantages of this invention are:

a) reduced development time since the user only needs to select configuration settings for the controller, rather than design the controller architecture;

b) reduced development cost since extensive expertise or specialized equipment is not required to configure the controller, as built-in configuration management automates the process;

c) reduced parts count since a single controller contains all the elements required for closed-loop control;

d) reduced parts cost since the flexible closed loop controller can be manufactured in mass volume for a large number of markets and applications;

e) improved performance since the invention is developed specifically for closed-loop applications;

f) improved reliability since the same controller is tested in a variety of applications by a variety of users.

Further objects and advantages of this invention will become apparent from a consideration of the drawings and ensuing description.

DRAWING FIGURES

FIG. 1 shows preferred embodiment of invention.

FIG. 2A shows invention firmware main loop.

FIG. 2B shows invention firmware configuration logic.

FIG. 2C shows invention firmware setpoint selector.

FIG. 2D shows invention firmware signal conditioner.

FIG. 2E shows invention firmware error amplifier.

FIG. 2F shows invention firmware compensator.

FIG. 2G shows invention firmware output driver.

FIG. 2H lists firmware operational parameters.

FIG. 3 shows invention alternate implementation.

DESCRIPTION

Preferred Embodiment

A preferred embodiment of the invention is illustrated in FIG. 1. Flexible Controller 20 controls Plant 28 by adjusting Output Driver 48 signals to achieve desired sensor signals at Signal Conditioner 40. Plant 28 typically includes an electronic power stage and a load. Power converters and actuator systems are common plants. Typical sensor signals include voltage, current, position, velocity, temperature, or pressure. Sensor signals may be analog or digital. Typical drive signals include single or multiple digital states for switching power stages, analog levels for linear power stages, or digital sequence for pulsed power stages.

Flexible Controller 20 receives controller configuration commands from User Interface 26 and returns operational data. Computers, microprocessors, and analog or digital circuits are common user interfaces. Flexible Controller 20 is comprised of CPU 30, Configurable Elements 24, and Configuration Management 22. CPU 30 is the Central Processing Unit. Configurable Elements 24 is a group of elements comprising a closed-loop controller that may be configured or adjusted for a variety of applications. Configuration Management 22 adjusts or configures operation of the Configurable Elements 24 for a specific application.

Configurable Elements 24 is comprised of Setpoint Selector 42, Signal Conditioner 40, Error Amplifier 44, Compensator 46, and Output Driver 48. One or more of these elements may be adjusted to accommodate a variety of applications or changing conditions within a single application. Setpoint Selector 42 sets the regulation setpoint for Plant 28 sensor signals. These sensor signals are processed by Signal Conditioner 40. The difference between the outputs of Setpoint Selector 42 and Signal Conditioner 40 is determined and amplified by Error Amplifier 44. The amplified error signal is compensated for desired transient response by Compensator 46. The compensated signal is then converted to appropriate drive signals for Plant 28 by Output Driver 48.

Configuration Management 22 is comprised of Data Interface 32, Memory 34, Timer 36, and Configuration Logic 38. These elements with CPU 30 configure controller operation through adjustment of Configurable Elements 24. Controller reconfiguration may be interactive with User Interface 26 or autonomous. Data Interface 32 receives controller configuration commands from User Interface 26 and returns operational data. Memory 34 saves controller configuration commands. Memory 34 may also hold program code and operational data. Timer 36 is reference for fixed interval events. Configuration Logic 38 allows autonomous reconfiguration of Configurable Elements 24. Equations, lookup tables, and fuzzy logic are typical methods for Configuration Logic 38 to autonomously adjust controller operation.

The invention preferred embodiment is an integrated circuit containing a CPU with peripheral components. Microcontrollers or Digital Signal Processors (DSP) are typical integrated circuits satisfying these requirements. Typical peripheral components include:

Data Interface 32: data port (parallel or serial)
Memory 34: program and data memory, parameter storage
Timer 36: oscillator and counters
Signal Conditioner 40: Analog-Digital-Converter (ADC) or encoder input
Output Driver 48: Pulse-Width-Modulator (PWM) or Digital-Analog-Converter (DAC)

System implementations include characterizing plant with stimulus output and sensor input analysis similar to a network analyzer. Built-in test and calibration functions facilitate production and test. Adaptive closed loop control could also be incorporated.

Operation

The invention firmware (program code that controls hardware) for the preferred embodiment is flowcharted in FIGS. 2A through 2G. FIG. 2H lists key firmware operational elements. FIG. 2A shows the main program loop and FIGS. 2B through 2G show operation of the processes called by the main program.

The firmware program starts at box 60 of FIG. 2A. Processes 62 and 64 initialize the controller for operation. Process 62 reads configuration commands from nonvolatile storage and stores them in RAM registers for program execution. Box 64 then configures peripheral components based on configuration commands. Processes 38, 42, 40, 44, 46, 48 execute closed-loop control algorithms based on configuration commands. Each of these processes correspond to an element of FIG. 1. These processes are discussed in FIGS. 2B through 2G respectively. Process 66 reads the serial data port of Data interface 32 and writes RAM registers for continual update of controller for interactive operation. Commands may also include data transmittal and operation halt or reset. Process 68 reads Signal Conditioner 40 ADC or encoder for current sensor signal values. Decision 70 executes processes 66 and 68 until the next control update is due. That is when sensor signals are processed for a new drive signal level in Processes 38, 42, 40, 44, 46 and 48.

Configuration Logic 38 process is shown in FIG. 2B. Two autonomous configuration techniques are shown: lookup tables and fuzzy logic. Mathematical equations could be used as well. Decision 72 determines the table pointer source. The lookup table may be time based for waveform generation. The table pointer could be an analog sensor or program parameter value. Examples include temperature compensated voltage regulation or impedance simulation. Fuzzy Logic 74 selects an action based on the value of a program parameter with respect to a specified constant. Examples include shutdown if temperature excessive, decrement drive if load excessive, dump resistor if bus overvoltage, or under-voltage lockout.

Setpoint Selector 42 process is shown in FIG. 2C. Decision 76 enables a soft start mode where the setpoint is ramped from to final value slowly. Decision 78 determines the source of the setpoint value. It could be a static reference, dynamic table lookup, proportional to a analog sensor level, or an interactive command. Processes 80 and 82 change the setpoint to a temporary alternate value to monitor the system step response. This facilitates selection of compensation gains for fast stable response. Process 84 outputs a PWM duty cycle for enhanced control resolution mode.

Signal Conditioner 40 process is shown in FIG. 2D. Decision 86 determines the ADC sensor that loop closes the feedback loop, or encoder for motion. Decision 88 determines the source of the feedforward parameter. Process 90 stores the step response in a table for later examination. Error Amplifier 44 process is shown in FIG. 2E. Error signal is generated in Process 92 and amplified in process 96. Process 94 inverts the error signal to compensate for sensor circuit inversions.

Compensator 46 process is shown in FIG. 2F. Decision 98 determines the compensation mode: nominal PID, secondary PID, Open Loop, or Fuzzy Logic Override. Process 108 calculates gains based on pointers if nonlinearly spaced. Processes 110 and 112 calculate PID output. Process 114 calculates feedforward term. Output Driver 48 process is shown in FIG. 2G. Decision 116 determines output mode: Single PWM, Full-Bridge PWM, 3 Phase PWM, DAC, or Digital Sequence.

Alternate Embodiment

It may be advantageous to develop a custom integrated circuit with optimized dedicated closed-loop control circuitry. This would allow improved performance at minimal cost. Examples include hardware compensation and functions normally found analog power controllers, such as gate drive, fast current limit, PWM, reference, and under-voltage lockout. FIG. 3 shows a version where the configurable elements are constructed from op-amps and digital potentiometers for fast response with high resolution.

Conclusion, Ramifications, and Scope

The disclosed invention is a flexible closed-loop controller that may be quickly and easily configured for a broad range of applications. This invention reduces development time and cost, reduces parts count and cost, and improves performance and reliability of closed-loop control systems.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by the appended claims.

I claim:

1. A closed-loop controller, comprising:
   a) a configurable signal conditioner element to convert a sensor signal at said closed-loop controller input,
   b) a configurable setpoint selector element to set regulation point of said closed-loop controller,
   c) an error amplifier to difference said signal conditioner output and said setpoint selector output,
   d) a configurable compensator element to filter said error amplifier output,
   e) a configurable output driver element to convert said compensator output to said closed-loop controller output,
   f) a configuration management subsystem to configure the configurable elements,
   whereby said closed-loop controller is configurable for a multitude of closed-loop control applications.

2. The closed-loop controller of claim 1 wherein said closed-loop controller is an integrated circuit comprising a central processing unit with peripheral components.

3. The closed-loop controller of claim 1 wherein the configurable elements comprise operational amplifiers and digital poteniometers.

4. The closed-loop controller of claim 1 wherein said configuration management subsystem comprises:
   a) a data interface,
   b) a memory,
   c) a timer,
   d) a central processing unit,
   e) a configuration logic element.

5. The closed-loop controller of claim 1 wherein said configuration management comprises a configuration logic element that employs table lookup to autonomously reconfigure at least one of the configurable elements during operation.

6. The closed-loop controller of claim 1 wherein said configuration management comprises a configuration logic element that employs fuzzy logic to autonomously reconfigure at least one of the configurable elements during operation.

7. The closed-loop controller of claim 1 wherein said signal conditioner can be configured for at least two different operating modes selected from the group consisting of primary analog feedback and secondary analog feedback and encoder feedback and feed-forward.

8. The closed-loop controller of claim 1 wherein said setpoint selector can be configured for at least two different operating modes selected from the group consisting of soft start and static reference and table lookup and analog signal and digital command.

9. The closed-loop controller of claim 1 wherein said compensator can be configured for at least two different operating modes selected from the group consisting of nominal PID and secondary PID and open loop and fuzzy logic.

10. The closed-loop controller of claim 1 wherein said output driver can be configured for at least two different operating modes selected from the group consisting of single PWM and full-bridge PWM and three phase PWM and analog output and digital sequence.

11. A method of closed-loop control, comprising:
    a) providing a configurable signal conditioner element,
    b) providing a configurable setpoint selector element,
    c) generating an error signal by difference of the conditioned sensor signal and said setpoint selector output,
    d) providing a configurable compensator element to filter said error signal,
    e) providing a configurable output driver element to convert said compensator output,
    f) providing a configuration management means to configure the configurable elements,
    whereby said closed-loop controller is highly adaptable.

12. The method of closed-loop control of claim 11 wherein said configuration management means returns system parameter readings through a data interface during operation, whereby data acquisition capability is achieved for system performance evaluation.

13. The method of closed-loop control of claim 11 wherein said configuration management means comprises:
    a) modifying the value of said setpoint selector by a step change for a preselected duration,
    b) returning subsequent readings of the conditioned sensor signal through a data interface,
    whereby a step transient response is available for stability evaluation.

14. The method of closed-loop control of claim 11 wherein said configuration management means is autonomous after initial configuration.

15. The method of closed-loop control of claim 11 wherein said configuration management means reconfigures at least one of the configurable elements based on operating conditions.

16. The method of closed-loop control of claim 11 wherein said configuration management means adjusts gain in said compensator for stable operation.

17. The method of closed-loop control of claim 11 wherein said configuration management means adjusts at least one configurable element to limit operation to a specified range.

18. The method of closed-loop control of claim 11 wherein said configuration management executes firmware configuration commands.

* * * * *